United States Patent [19]
Bos

[11] Patent Number: 5,187,603
[45] Date of Patent: Feb. 16, 1993

[54] HIGH CONTRAST LIGHT SHUTTER SYSTEM
[75] Inventor: Philip J. Bos, Beaverton, Oreg.
[73] Assignee: Tektronix, Inc., Wilsonville, Oreg.
[21] Appl. No.: 826,278
[22] Filed: Jan. 27, 1992

Related U.S. Application Data
[63] Continuation of Ser. No. 546,820, Jun. 26, 1990, abandoned.

[51] Int. Cl.⁵ .............................................. G02F 1/13
[52] U.S. Cl. ........................................ 359/73; 359/63; 359/93
[58] Field of Search ............... 350/337, 339 R, 346, 350/347 E, 347 R, 348, 335; 359/53, 62, 73, 93, 63

[56] References Cited
U.S. PATENT DOCUMENTS

| | | | |
|---|---|---|---|
| 4,385,806 | 5/1983 | Fergason | 350/347 R |
| 4,541,691 | 9/1985 | Buzak | 350/347 R |
| 4,566,758 | 1/1986 | Bos | 350/345 |
| 4,582,396 | 4/1986 | Bos et al. | 350/347 |
| 4,583,825 | 4/1986 | Buzak | 350/347 E |
| 4,595,259 | 6/1986 | Perregaux | 350/331 |
| 4,635,051 | 1/1987 | Bos | 359/64 |
| 4,652,087 | 3/1987 | Bos et al. | 350/347 E |
| 4,670,744 | 6/1987 | Buzak | 359/73 |
| 4,674,841 | 6/1987 | Buzak | 350/347 E |
| 4,701,028 | 10/1987 | Clerc et al. | 350/347 E |
| 4,719,507 | 1/1988 | Bos | 358/92 |
| 4,767,190 | 8/1988 | Dir et al. | 350/339 |
| 4,852,976 | 8/1989 | Suzuki | 350/347 R |
| 4,884,876 | 12/1989 | Lipton et al. | 350/347 |
| 4,936,654 | 6/1990 | Suzaki et al. | 350/347 E |
| 4,984,873 | 1/1991 | Takiguchi et al. | 350/347 R |
| 4,984,874 | 1/1991 | Yamamoto et al. | 350/347 R |
| 4,991,941 | 2/1991 | Kalmanash | 350/347 E |
| 5,061,042 | 10/1991 | Nakamura et al. | 359/73 |

FOREIGN PATENT DOCUMENTS 0294899 12/1988 European Pat. Off.

OTHER PUBLICATIONS

Hark and Hull, "Contrast Improvement of Transient Nematic Liquid Crystal Image Bars of Retardation Compensation". 1988 International Display Research Conference, 170–73 (1988).

J. L. Fergason, "Performance of a Matrix Display Using Surface Mode", Conference Record of 1980 Biennial Display Research Conference, 177–78 (1980).

Jerrard, "Optical Compensators for Measurement of Elliptical Polarization", Journal of the Optical Society of America, Jan. 1948, 35–58.

Brown, "Elliptic Polarimeter for the Student Laboratory: Specimens of Elliptically Polarized Light", American Journal of Physics, Mar. 1958, 183–187.

Primary Examiner—Rolf Hille
Assistant Examiner—Minhloan Tran
Attorney, Agent, or Firm—John D. Winkelman; Paul S. Angello

[57] ABSTRACT

A light shutter system (10) incorporates a liquid crystal cell (12) operating as a variable optical retarder to selectively produce opaque and transmissive optical states corresponding to the respective first and second amounts of optical retardation of the variable optical retarder. The cell switches between a residual amount of retardation and an increased amount that equals the sum of half-wave retardation and the amount of residual retardation to provide a shutter system whose system retardation switches between zero retardation and half-wave retardation and thereby produces opaque and transmissive states with an optimal contrast ratio. The cell is positioned between a linear polarizing filter (14) and an elliptical analyzer (16), the latter including a linear polarizing filter (20) and an optical retarder (18) of fixed value. The transmission axis of the linear polarizing filters are angularly displaced relative to a projection of the optic axes of the cell by an amount that provides maximum light extinction in the opaque state. Maximum output light transmissive in the transmission state is achieved by establishing for the cell an optical thickness that exceeds half-wave retardation by an additional amount equal to the residual retardation. Other preferred embodiments that provide equivalent performance are described.

10 Claims, 3 Drawing Sheets

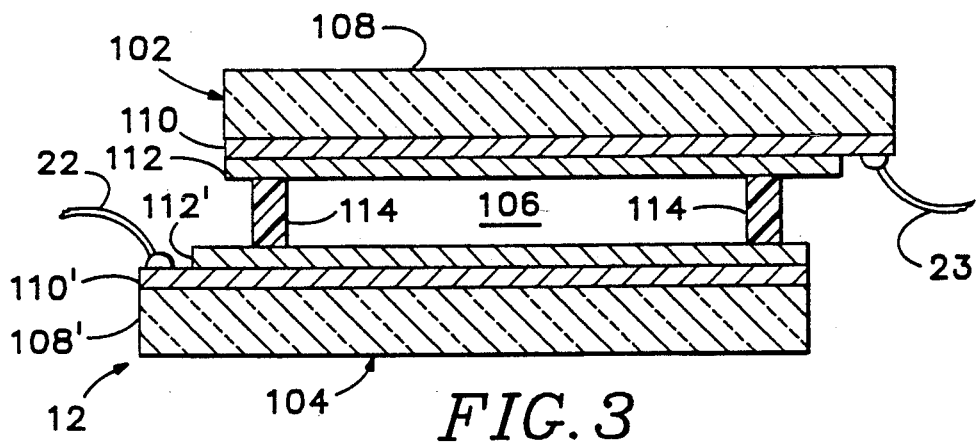
FIG. 3
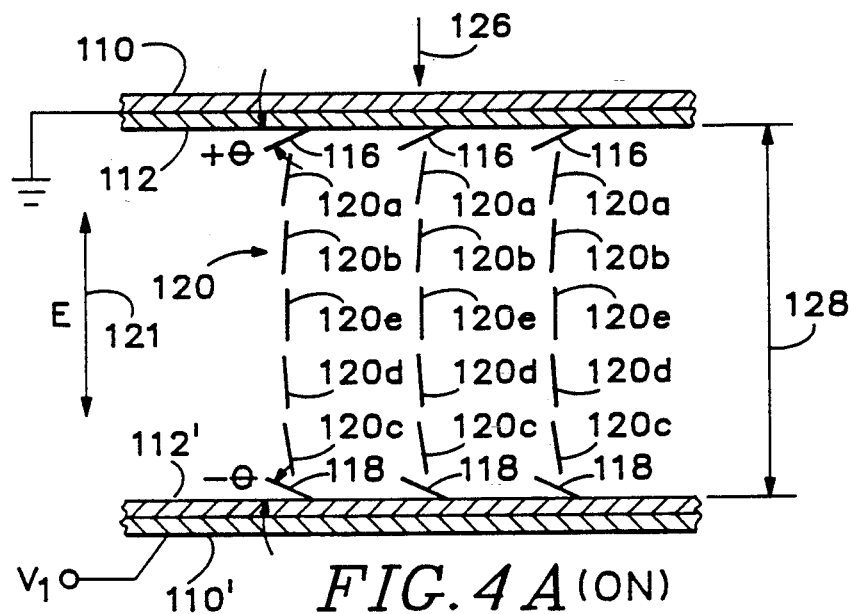
FIG. 4A (ON)
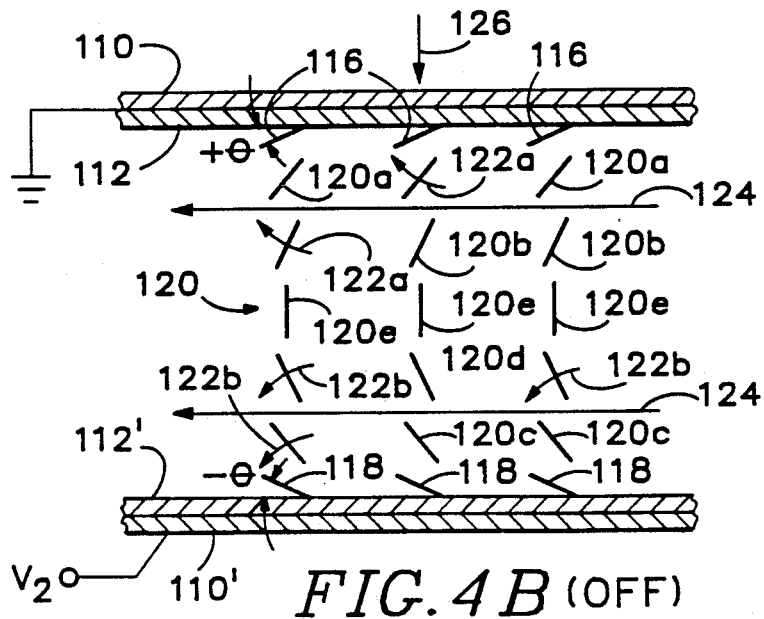
FIG. 4B (OFF)

HIGH CONTRAST LIGHT SHUTTER SYSTEM

This is a continuation of application of Ser. No. 07/546,820 filed Jun. 26, 1990 and now abandoned.

TECHNICAL FIELD

The present invention relates to light shutter systems and, in particular, to a light shutter system having an opaque optical state with maximum light extinction and a transmissive optical state with maximum light transmission.

BACKGROUND OF THE INVENTION

Light shutter systems such as, for example, stereoscopic systems switching between opaque and transmissive optical states to alternately transmit left-and right-eye images to a viewer preferably have high contrast ratios. A maximum contrast ratio can be achieved by providing maximum output light extinction in the opaque state to block an image from the viewer's eye and maximum light transmission in the transmissive state to convey an image to the viewer's eye.

Light shutters have been proposed that include variable optical retarders positioned between crossed linear polarizers. The variable optical retarders switch ideally between zero and half-wave retardation states. In the ideal case, linearly polarized incident light propagates unaffected through the variable optical retarder in its zero retardation state and is completely blocked by the output linear polarizer. Linearly polarized incident light propagating through the variable optical retarder in its half-wave retardation state undergoes a 90° rotation of polarization direction and is completely transmitted by the output linear polarizer. In this ideal light shutter, the zero retardation state of the variable optical retarder corresponds to an opaque state of the shutter, and the half-wave retardation state of the variable optical retarder corresponds to the transmissive state of the shutter.

Practicably realizable variable optical retarders are often incapable of achieving true zero retardation values and, therefore, have a non-zero amount of residual retardation or birefringence when it is desired that the shutter be in the opaque state. This residual retardation elliptically polarizes the light propagating through the variable optical retarder in the opaque state. As a consequence, light exiting the variable optical retarder cannot be entirely blocked by the output linear polarizer, and the extinction of light in the opaque state is not as high as desired. This imperfect extinction of light in the opaque state lowers the contrast ratio, which is defined as the ratio of the light intensity transmitted in the transmissive and opaque states of the shutter.

One way of reducing residual birefringence is to apply a very high voltage across the liquid crystal cell and thereby introduce a high intensity electric field within the cell. The use of high drive voltages is undesirable, however, because it entails the increased expense of providing a high voltage circuit that is capable of driving the capacitive load presented by the cell and creates possible reliability problems stemming from a consequent increase in power dissipation.

U.S. Pat. No. 4,767,190 of Dir et al. describes a liquid crystal image bar having an enhanced contrast ratio. The Dir et al. image bar includes a birefringent liquid crystal cell positioned between an elliptical analyzer and a linear polarizer to produce opaque and transmissive optical states. The elliptical analyzer comprises a tilted polarizer and a quarter-wave plate that cooperate to compensate for elliptical polarization introduced by the residual birefringence of the liquid crystal cell when it is excited to its field-aligned state. The effect of the residual birefringence is to reduce light extinction in the opaque state. The elliptical analyzer provides maximum light extinction in the opaque state at the possible expense of a quantity of light loss in the transmissive state.

Dir et al. notes, in column 9 beginning at line 51, that the contrast enancement achieved with the described quarter-wave plate approach results in nearly doubled response times. Such an increase is often undesirable and in many applications is unacceptable.

U.S. Pat. No. 4,884,876 of Lipton et al. describes an achromatic stereoscopic system using a linear polarizer, an elliptical analyzer, and a liquid crystal cell of the same construction taught by Dir et al. to provide alternating left- and right-eye image scenes to a viewer. Lipton et al. states that judicious alignment of the transmission axes of the linear and elliptical polarizers and the rub axis of the liquid crystal cell achieves an optimal dynamic range between optical states. Lipton et al. advises that an optimal dynamic range may be less than the maximum dynamic range.

Applicant believes this compromise characterizing the design of the Lipton et al. system stems from the inability of Lipton et al. to provide a system that can both minimize light transmission in the opaque state and maximize light transmission in the transmissive state.

SUMMARY OF THE INVENTION

An object of the present invention is, therefore, to provide a light shutter system that provides a maximum contrast ratio between two optical states.

Another object of the invention is to provide such a system that develops maximum light extinction and maximum light transmission in its respective opaque and transmissive optical states.

A further object of the invention is to provide such a system that is capable of providing maximum light extinction in the opaque state without using a high voltage drive signal.

Yet another object of the invention is to provide such a system having maximum light extinction in the opaque state but without significantly increased response times.

Still another object of the invention is to provide such a system of the stereoscopic type.

The present invention is a light shutter system that incorporates a variable optical retarder to selectively produce opaque and transmissive optical states corresponding to respective first and second amounts of optical retardation of the variable optical retarder. The system includes a liquid crystal cell operating as a variable optical retarder that provides a residual amount of optical retardation when the cell is in a field-aligned state and an increased amount of optical retardation when the cell is in a partly relaxed state. The increased amount of retardation is established by the optical thickness of the cell and represents the sum of an residual retardation and the amount of retardation equal to a half-wavelength of the dominate wavelength of light that is desired to be controlled. The residual amount of retardation produces the opaque state with maximum light extinction, and the increased amount of retardation provides the transmissive state with maximum light transmission.

The liquid crystal cell is positioned between a linear polarizing filter and an elliptical analyzer, the latter including a linear polarizing filter and an optical retarder of fixed value. The transmission axes of the linear polarizing filters are angularly displaced relative to a projection of the optic axes of the cell by an amount that provides maximum light extinction in the opaque state. Such maximum light extinction is accomplished by the elliptical analyzer compensating for the residual amount of retardation of the liquid crystal cell in its field-aligned state.

Maximum output light transmission in the transmissive state is achieved by establishing for the liquid crystal cell an optical thickness that exceeds half-wave retardation by an additional amount equal to the residual retardation. The effect of this additional amount of retardation is compensated for by the elliptical analyzer.

Therefore, the liquid crystal cell switches between the residual amount of retardation and an increased amount of retardation substantially equal to the sum of half-wave retardation and the amount of residual retardation and cooperates with the elliptical analyzer that compensates for the effect of the additional residual retardation present in both the opaque and transmissive states, to provide a shutter system that produces opaque and transmissive states with a maximum contrast ratio.

Additional objects and advantages of the present invention will be apparent from detailed description of preferred embodiments thereof, which proceeds with reference to the accompanying drawings.

BRIEF DESCRIPTION OF THE DRAWINGS

FIG. 3 is a diagrammatic cross-sectional side elevation view of the liquid crystal cell incorporated in the system of the present invention.

FIGS. 4A and 4B are schematic diagrams of the director alignment configuration of the liquid crystal cell used in the system of the present invention in, respectively, the field-aligned ("ON") state and the partly relaxed ("OFF") state.

DETAILED DESCRIPTION OF PREFERRED EMBODIMENTS

Figure 1:
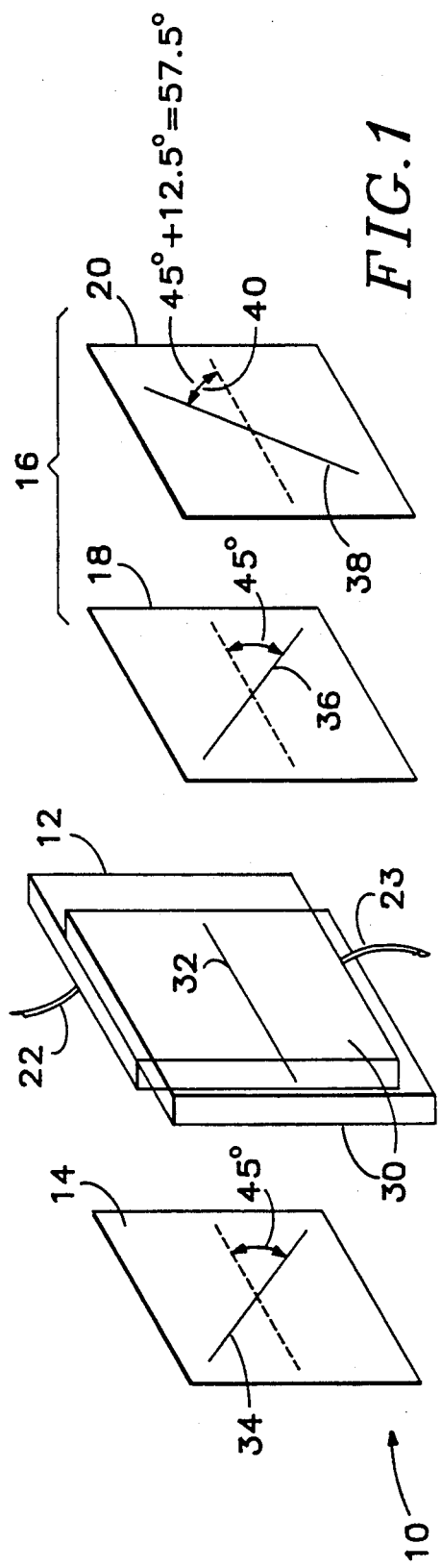
FIG. 1 is a diagram of a liquid crystal light shutter showing the orientation of the transmission axes of the polarizing filters and optic axis of the optical retarder relative to the projection of the optic axes of the liquid crystal variable optical retarder in a first embodiment of the present invention.

FIG. 1 shows a light shutter system 10 according to a preferred embodiment of the present invention. Such a shutter system may be used to particular advantage in the left and right eye pieces of active stereoscopic viewing glasses to which suitable drive voltages are applied to decode stereoscopic image information carried by light incident to the glasses.

System 10 includes a liquid crystal cell 12 positioned in plane parallel relation between a neutral density linear polarizing filter 14 and an elliptical analyzer 16. Analyzer 16 includes a quarter-wave plate 18 and a neutral density linear polarizing filter 20. Cell 12 operates as a variable optical retarder that switches between two optical retardation states in response to voltages applied to electrical conductors 22, 23 by a drive circuit (not shown). Cell 12 develops a residual amount of retardation in response to an applied voltage, $V_1$, which is preferably ±15 volts, and an increased amount of retardation established by the optical thickness of cell 12 in response to a reduced voltage, $V_2$, which is preferably 0.0 volts. The voltages $V_1$ and $V_2$ develop a field-aligned or "ON" state and a partly relaxed or "OFF" state, respectively, of cell 12.

The transmission axes of linear polarizing filters 14 and 20 and the optic axis of quarter-wave plate 18 are aligned relative to the projection of the optic axes of cell 12, and the optical thickness of cell 12 is set so that system 10 provides an opaque optical state with maximum light extinction whenever cell 12 is excited to its "ON" state and a transmissive state with maximum light transmission whenever cell 12 partly relaxes to its "OFF" state.

More specifically, cell 12 has light communicating surfaces 30 on which its optic axes form a horizontally aligned projection 32. Projection 32 of the optic axes of cell 12 is parallel to the rub direction of a cell whose surface alignment film is conditioned by rubbing, which will be further described below. Polarizing filter 14 has a transmission axis 34 that is inclined at a 45° angle in a clockwise sense relative to projection 32 of the optic axes of cell 12.

Quarter-wave plate 18 and linear polarizing filter 20 of elliptical analyzer 16 have an optic axis 36 and a transmission axis 38, respectively. Optic axis 36 of quarter-wave plate 18 and transmission axis 38 of polarizing filter 20 are oriented to compensate for the residual retardation resulting from the residual birefringence of cell 12 in the "ON" state. In a preferred embodiment, optic axis 36 of quarter-wave plate 18 is parallel to transmission axis 34 of polarizing filter 14, and transmission axis 38 of polarizing filter 20 is inclined at an angle 40 of 57.5° in a counterclockwise sense relative to the horizontally aligned projection 32 of the optic axes of cell 12. It will be appreciated that modifying elliptical analyzer 16 by inclining optic axis 36 of quarter-wave plate 18 at a 45° angle in a counter-clockwise direction relative to projection 32 of the optic axes of cell 12 and by inclining transmission axis 38 of polarizing filter 20 at a 32.5° angle in a counter-clockwise direction relative to projection 32 of the optic axis of cell 12 provides an equivalent optical component arrangement to that shown in FIG. 1.

System 10 is designed to process incident light in the following manner. Linear polarizer 14 and elliptical analyzer 16 are oriented relative to projection 32 of the optic axes of cell 12 to provide maximum extinction for all wavelengths of incident light when cell 12 is excited to the "ON" state. In a preferred embodiment, cell 12 in the "ON" state provides about 30 nm of residual retardation and thereby imparts a small amount of elliptical polarization to the linearly polarized light incident to the cell. The elliptically polarized light exiting cell 12 and striking elliptical analyzer 16 has orthogonally related high intensity and low intensity components. The low intensity component passes through transmission axis 38 of polarizer 20 and thereby reduces the extinction of light in the opaque state.

To compensate for the 30 nm of residual retardation and thereby eliminate the elliptical polarization imparted to light propagating through cell 12, transmission axis 38 of polarizer 20 is angularly displaced by the 57.5° angle 40 relative to projection 32 of the optic axis of cell 12. Thus, the introduction of quarter-wave plate 18 and the tilting of transmission axis 38 of polarizer 20 provide maximum light extinction when cell 12 is in the "ON" state.

A prior art light shutter system using a variable optical retarder to operate between opaque and transmissive states ideally switches between respective system retardation amounts of nominally zero and half-wave retardation. For example, such a prior art system switches between 0 nm and about 270 nm of system retardation, in which 270 nm represents half-wave retardation. The selection of 270 nm of retardation stems from an intention to maximize the transmission of white light through the system. Because system 10 uses elliptical analyzer 16 to compensate for 30 nm of residual retardation of cell 12 in the "ON" state to provide maximum light extinction in the opaque state, in the absence of additional compensation, there is a consequent reduction of light transmission in the transmissive state. This is so because elliptical analyzer 16 also compensates for 30 nm the retardation of light imparted by cell 12 in the "OFF" state.

A preferred embodiment of system 10 incorporates cell 12 whose optical thickness is greater than the nominal optical thickness that provides 270 nm of system retardation when cell 12 is switched to the "OFF" state. Cell 12 is constructed with a thickness dimension that provides, for liquid crystal material of a specified birefringence, an optical thickness that develops 300 nm of optical retardation for cell 12 in the "OFF" state. Cell 12 switches between 30 nm and 300 nm of optical retardation and cooperates with the elliptical analyzer that compensates for the effect of 30 nm of retardation in both states, to provide system 10 with, respectively, an opaque state and a transmissive state. Thus, the optical components of system 10 are oriented to achieve maximum light extinction in the opaque state, and the optical thickness of cell 12 is specified to achieve maximum light transmission in the transmissive state.

In addition to achieving a maximum contrast ratio, system 10 does not suffer from a loss of speed; the response time of the system is essentially the same as for a cell without the quarter-wave plate compensator.

Figure 2:
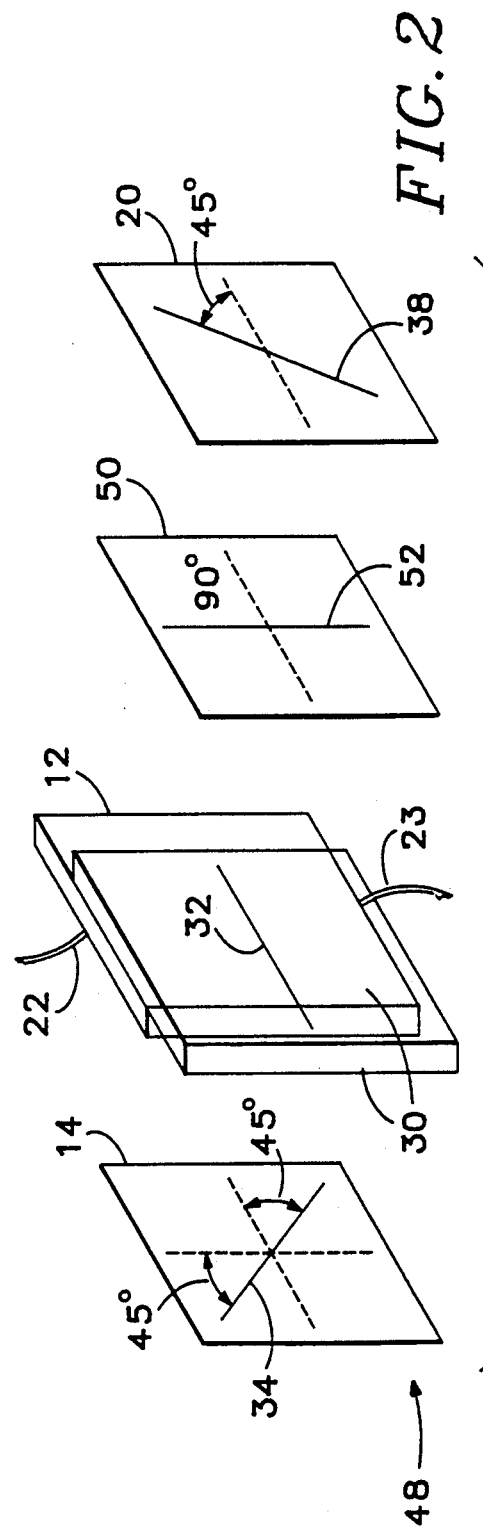
FIG. 2 is a diagram showing the orientation of the transmission axes of the polarizing filters and optic axis of the optical retarder relative to the projection of the optic axes of the liquid crystal variable optical retarder in an alternative embodiment of the present invention.

FIG. 2 shows an alternative light shutter system 48. With reference to FIG. 2, an optical retardation plate 50 providing 30 nm of retardation substitutes for quarter-wave plate 18 in system of FIG. 1, and polarizing filter 20 is oriented so that its transmission axis 38 is orthogonally aligned with transmission axis 34 of polarizing filter 14. Optic axis 52 of retardation plate 50 is orthogonally aligned with projection 32 of the optic axes of cell 12 and disposed at 45° angles relative to transmission axes 34 and 38 of the respective polarizing filters 14 and 20. The 30 nm of retardation provided by retardation plate 50 compensates for the 30 nm of residual retardation provided by cell 12 in the "ON" state in the manner described above with reference to FIG. 1. The optical thickness of cell 12 is also the same as that described above with reference FIG. 1.

Retardation plate 50 is suitably constructed by laminating in system 48 a film of cellulose diacetate of appropriate thickness in the range of 2–10 mils (nominally 3–4 mils) to provide 30 nm retardation. A suitable film of this type is manufactured by Courtaulds Acetate, Derby, United Kingdom.

The preferred embodiments of the present invention incorporate liquid crystal cell 12 operating as a 30 nm to 300 nm optical retarder to operate systems 10 and 48 between zero and half-wave optical retardation. Liquid crystal cell 12 controls the retardation of light passing therethrough in response the intensity of an electric field produced by an excitation voltage applied to the cell electrode structures.

With reference to FIG. 3, a liquid crystal cell 12 includes a pair of generally parallel, spaced-apart electrode structures 102 and 104 with nematic liquid crystal material 106 captured therebetween. Electrode structure 102 comprises a glass dielectric substrate 108 which has on its inner surface a layer 110 of electrically conducting, but optically transparent, material such as indium tin oxide. Director alignment film layer 112 is applied to conductive layer 110 and forms a boundary between electrode structure 102 and liquid crystal material 106. The surface of film 112 that contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structure 102 and 104 are offset relative to each other to provide access to conductive layers 110 and 110' for connecting at terminals 22, 23 the conductors of a selected output of a drive voltage circuit. Spacers 114 may be comprised of a suitable material such as glass fiber to preserve the general parallel relation between electrode structures 102 and 104.

With reference to FIGS. 4A and 4B, film layer 112 of electrode structure 102 is conditioned so that electrode structure surface contacting directors 116 are aligned parallel to each other at a tilt bias angle $+\theta$, which is measured in the counterclockwise sense with reference to the surface of film layer 112. Film layer 112' of electrode structure 104 is conditioned so that the electrode structure surface contacting directors 118 are aligned parallel to each other at a tilt bias angle $-\theta$, which is measured in the clockwise sense with reference to the surface of film layer 112'. Thus, liquid crystal cell 12 is fabricated so that the surface contacting directors 116 and 118 of the opposed surfaces of director alignment layers 112 and 112' of electrode structures 102 and 104, respectively, are tilt biased in opposite directions.

A first preferred method of effecting the desired alignment of the surface contacting directors entails the use of polyamide as the material that comprises the alignment film layers 112 and 112' on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 4A depicts the orientation of surface noncontacting directors 120 when an AC signal $V_1$ of ±15 volts is applied to conductive layers 110 and 110' of electrode structures 102 and 104, respectively. The signal $V_1$ on conductive layer 110' constitutes a first switching state produced at the output of the drive voltage circuit and produces an alternating electric field, E, between electrode structures 102 and 104 within liquid crystal cell 12 to force cell 12 into its "ON" state. A substantial number of the surface noncontacting directors 120 of a liquid crystal material 106 that has a positive anisotropy value align essentially end-to-end along direction 121 of the electric field flux lines within the cell, which direction is normal to the conditioned surfaces of the electrode structures. Thus, when cell 12 is excited into its "ON" state, the surface noncontacting directors 120 are aligned perpendicularly to the surfaces of the cell.

FIG. 4B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces that cause relaxation of the surface noncontacting directors from the end-to-end alignment of the "ON" state. The removal of signal $V_1$ constitutes a second switching state produced at the output of the drive voltage circuit. The director orientation shown in FIG. 4B corresponds to that of the "OFF" state of the cell. Switching cell 12 to the "OFF" state can also be accomplished by applying to the cell a signal $V_2$ of about 0.0 volts produced at the output of the drive voltage circuit.

Figure 5:
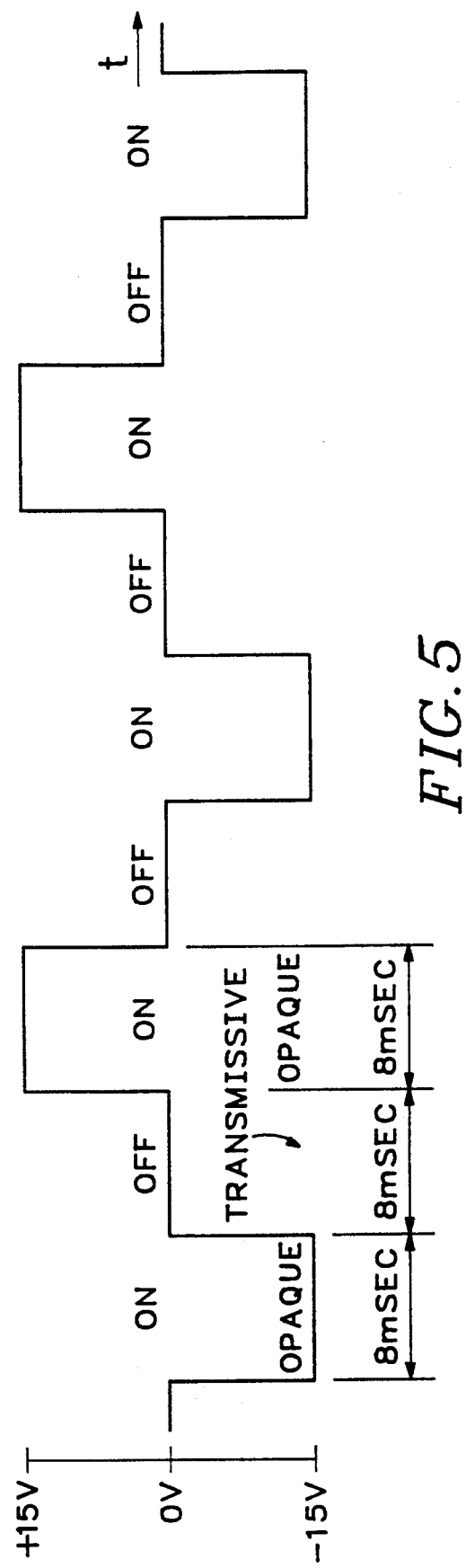
FIG. 5 shows a preferred drive voltage waveform that is applied to the liquid crystal cell in the system of the present invention.

FIG. 5 shows a preferred drive voltage waveform for operating cell 12 as a stereoscopic image decoder. Alternately applying $V_1 = \pm15$ volts and $V_2 = 0.0$ volts to cell 12 as indicated switches systems 10 and 48 between respective opaque and transmissive optical states.

During the transition from the "ON" state to the "OFF" state of cell 12, the surface noncontacting directors 120 recede from the end-to-end alignment normal to the electrode structure surfaces and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 12 relaxes to its "OFF" state, each one of a substantial number of the surface noncontacting directors 120 is aligned so that it projects a director component onto the surfaces of the cell. Surface noncontacting directors 120 lie, however, approximately in a plane that is perpendicular to the surfaces of cell 12.

The method of operating liquid crystal cell 12 as a 30 nm to 300 nm optical retarder is directed to the disclination-free surface noncontacting director relaxation from the electric field aligned or "ON" state depicted by FIG. 4A to the planar configuration or "OFF" state depicted by FIG. 4B. In the present invention, liquid crystal cell 12 is operated as a 30 nm to 300 nm optical retarder whose projection 32 of the optic axes of cell 12 corresponds to the alignment direction of the surface noncontacting directors 120.

Linearly polarized light that propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a very small projection 32 of the optic axes of cell 12 on the electrode structure surfaces of the cell. Under these conditions, liquid crystal cell 12 produces 30 nm optical retardation for incident light propagating in direction 126.

Linearly polarized light that propagates in direction 126 normal to the surfaces of electrode structures 102 and 104 is noncoincident with the alignment direction of surface noncontacting directors when the liquid crystal cell is in the "OFF" state. Directors 120 are oriented in such "OFF" state so that each one of a substantial number of them projects a component on the electrode structure surfaces of the cell. Under these conditions, liquid crystal cell 12 has an effective birefringence for generally normally incident light. The orientation of surface noncontacting directors 120 provides 300 nm optical retardation for light of the wavelength that satisfies the mathematical expression:

$$\frac{\Delta n' d}{\lambda} = 0.555,$$

where d represents the thickness 128 and $\Delta n$ represents the effective birefringence of the cell.

The optical thickness of cell 12 is defined herein as the product of the effective birefringence, $\Delta n'$, of the cell and the thickness, d. The effective birefringence, $\Delta n'$, is equal to or less than the birefringence, $\Delta n$, of the liquid crystal material by an amount determined by the cell construction and the applied drive voltage waveform. To provide 300 nm retardation in the "OFF" state, cell 12 may be fabricated with ZLI-1565 type liquid crystal material of $\Delta n = 0.129$ manufactured by E. Merck, of 5.5 micron thickness, and driven by the waveform shown in FIG. 5.

It will be obvious to those having skill in the art that many changes may be made in the above-described details of the preferred embodiments of the present invention without departing from the underlying principles thereof. The scope of the present invention should, therefore, be determined only by the following claims.

I claim:

1. A high contrast light shutter system that produces opaque and transmissive states corresponding to respective first and second states of a variable optical retarder, comprising:

variable optical retarder means for selectively providing a nonzero residual amount of retardation in the first state and an increased amount of optical retardation equal to the sum of the residual amount and half-wave retardation in the second state, the variable optical retarder having an optical thickness corresponding to the increased amount of retardation in the second state; and first and second polarizing means between which the variable optical retarder means is positioned for polarizing light incident to them, the first polarizing means including a fixed optical retarder and a linear polarizer that cooperate to compensate for the effect of the residual amount of retardation present in both states of the variable retarder so as to maximize and minimize light transmission in the respective transmissive and opaque states.

2. The light shutter system of claim 1 in which the linear polarizing filter and the fixed optical retarder of the first polarizing means constitute an elliptical polarizer, the fixed optical retarder providing quarter-wave retardation.

3. The light shutter system of claim 1 in which the linear polarizing filter of the first polarizing means constitutes a first linear polarizing filter having a first transmission axis and in which the second polarizing means comprises a second linear polarizing filter having a second transmission axis, the first and second transmission axes being disposed at an angle other than 90° to produce essentially complete light extinction and essentially maximum light transmission in the respective opaque and transmissive optical states.

4. The light shutter system of claim 3 in which the variable optical retarder means has an optic axis and light communicating surfaces onto which a projection of the optic axis falls, the projection of the optic axis being inclined at a 45° angle relative to only one of the first and second transmission axes.

5. The light shutter system of claim 4 in which the projection of the optic axis is inclined at a 45° angle relative to the second transmission axis.

6. The light shutter system of claim 3 in which the fixed optical retarder comprises a quarter-wave plate.

7. The light shutter system of claim 1 in which the fixed optical retarder is of a value that equals the residual amount of retardation.

8. The light shutter of claim 7 in which the linear polarizing filter of the first polarizing means constitutes a first linear polarizing filter having a first transmission axis and in which the second polarizing means comprises a second linear polarizing filter having a second transmission axis, first and second transmission axes being disposed at a 90° angle to produce essentially complete light extinction and essentially maximum light transmission in the respective first and second optical states.

9. The light shutter of claim 8 in which the fixed optical retarder is disposed at a 45° angle between the first and second transmission axes of the respective first and second linear polarizing filters.

10. The light shutter of claim 1 in which the variable optical retarder means is of the liquid crystal type.

* * * * *